J. E. WARMAN.
DIRECTION INDICATOR FOR AUTOMOBILES.
APPLICATION FILED MAY 28, 1915.
1,216,025.
Patented Feb. 13, 1917.
2 SHEETS—SHEET 1.
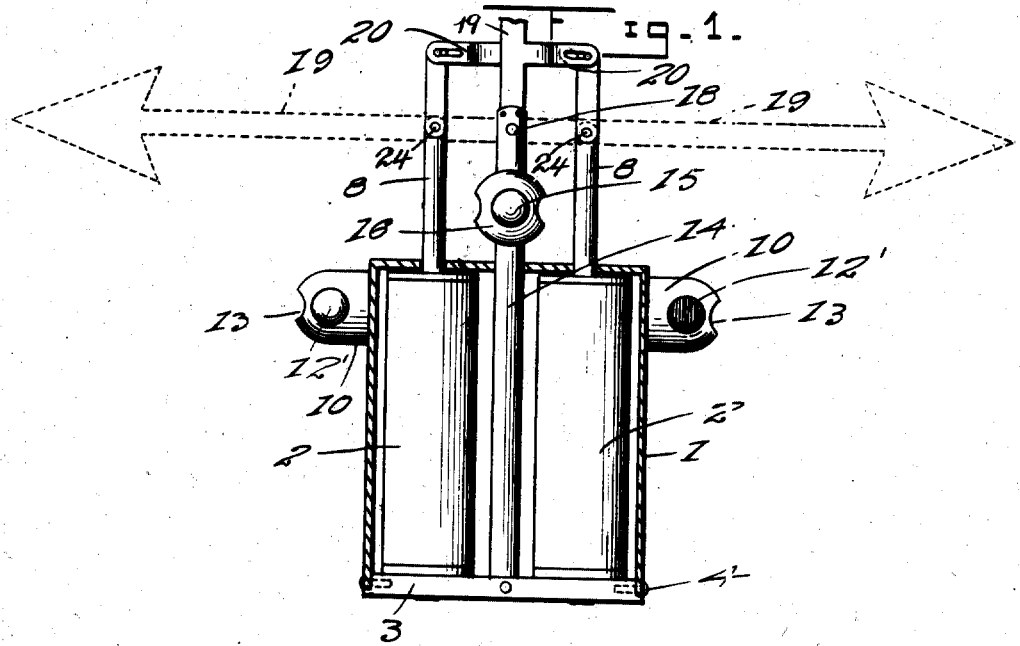
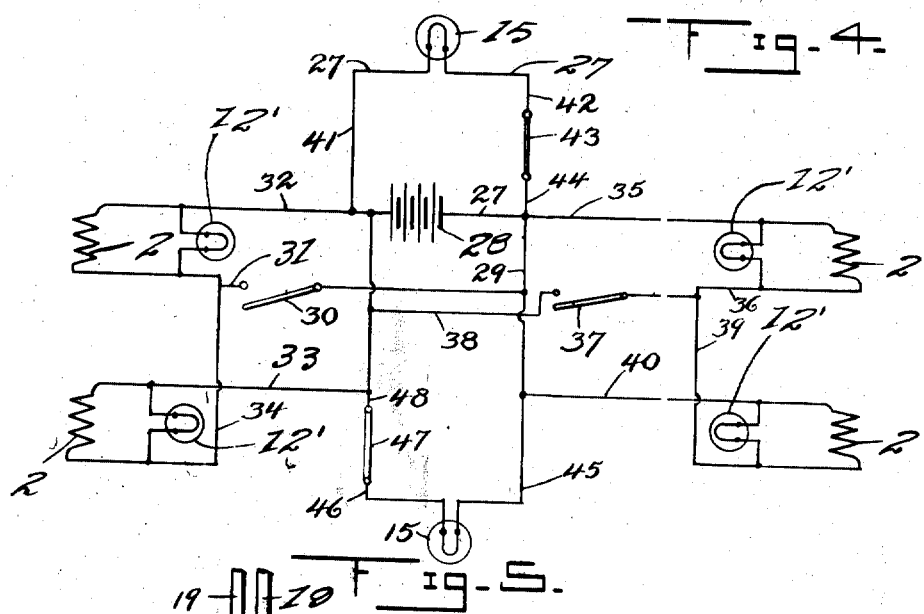
Inventor
J. E. Warman
Witnesses

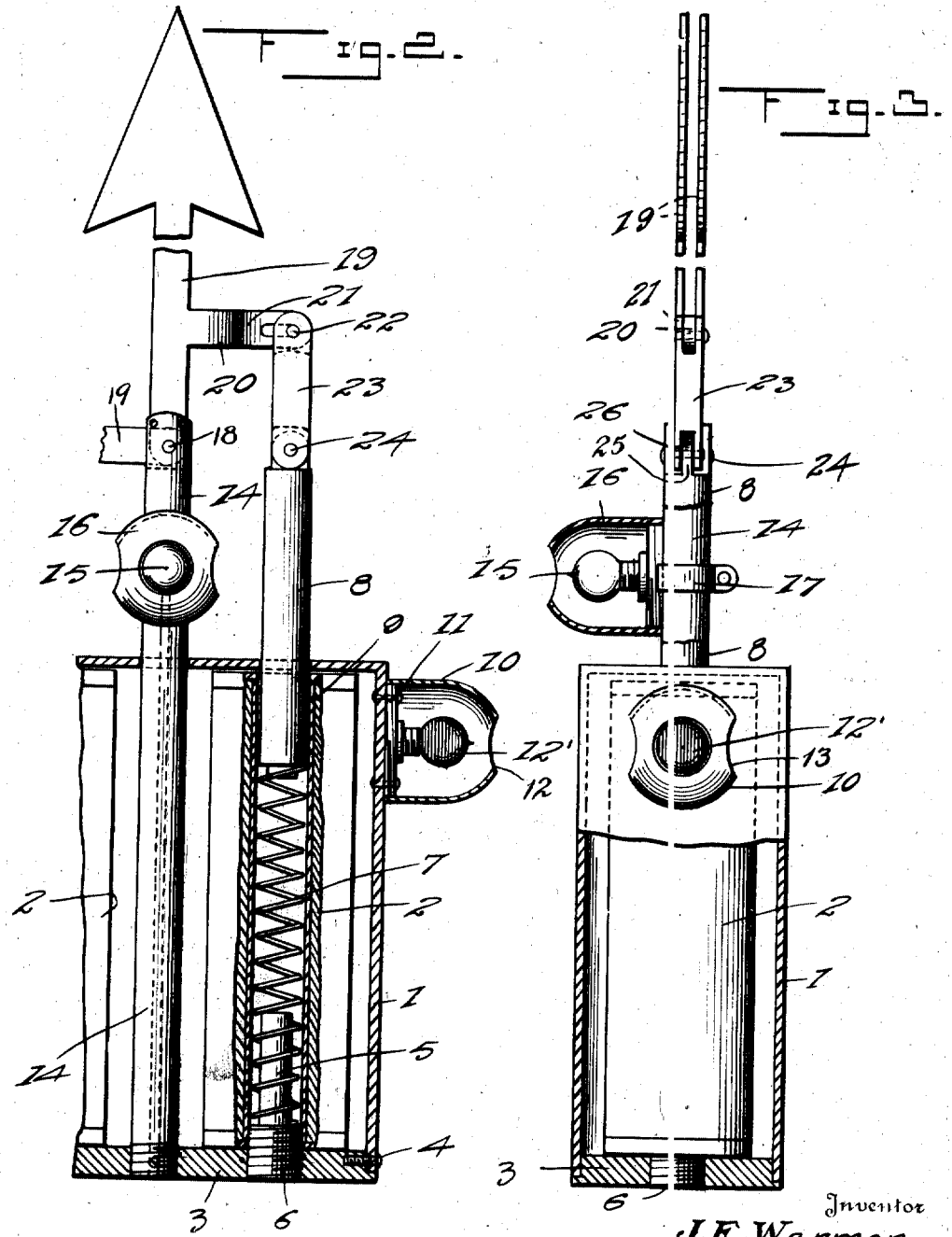

UNITED STATES PATENT OFFICE.

JOHN E. WARMAN, OF RIVERSIDE, CALIFORNIA.

DIRECTION-INDICATOR FOR AUTOMOBILES.

1,216,025.

Specification of Letters Patent.  Patented Feb. 13, 1917.

Application filed May 28, 1915. Serial No. 30,988.

*To all whom it may concern:*

Be it known that I, JOHN E. WARMAN, a citizen of the United States, residing at Riverside, in the county of Riverside and State of California, have invented certain new and useful Improvements in Direction-Indicators for Automobiles; and I do hereby declare the following to be a full, clear, and exact description of the invention, such as will enable others skilled in the art to which it appertains to make and use the same.

This invention relates to direction indicators for auto vehicles, and one of the principal objects of the invention is to provide simple and efficient means of simple construction to indicate the direction in which the auto vehicle intends to turn.

Another object of the invention is to provide an indicator at the front and rear of the machine, comprising arms which may be dropped to the right or to the left by means of solenoid coils and plungers connected to the pivoted arms, and colored lights being also energized at the same time the arms are thrown in position to indicate the direction in which the machine is about to turn.

The foregoing and other objects may be attained by means of the construction illustrated in the accompanying drawings, in which—

Figure 1 is a view in elevation and partial section of one of the indicators,

Fig. 2 is a fragmentary front elevation of the device with the casing and one of the solenoids in vertical section and illustrating one of the indicator arms in signaling position and broken away, Fig. 3 is a side elevation partly in section, illustrating the indicator arms in vertical position, Fig. 4 is a diagrammatic view of the electrical connections, and Fig. 5 is a detail view showing the manner of pivoting the indicating arms.

The direction indicators may be mounted at any suitable place in front and rear of the machine, and the indicators may be made small enough to be placed on the radiator cap in front and on the tire rack in rear of the car, said indicators being operated simultaneously by a switch or button so as to indicate to persons in front or rear, the direction intended to be taken. Since both the front and rear indicators are substantially identical in construction and operation, the description of one will serve for both.

Referring to the drawings, the numeral 1 designates a casing for containing two solenoid coils 2, said casing having a removable bottom or base 3 connected to the casing 1 by means of screws 4. Mounted in the base 3 are plunger stops 5 provided with screw threaded heads 6, and springs 7 encircle the reduced portion 5 of the stops and bear against the head 6 at one end, while the opposite ends of each of the springs 7 bear upon a solenoid core or plunger 8. The springs and solenoid cores are mounted in a brass tube 9. At each side of the casing is an electric lamp 12' covered by a metal cap 10, having a screw threaded connection 11 with the side of the casing 1, said metal cap 10 being provided with suitable openings 12 at the front and rear and similar openings 13 at the sides. These lights may be of different colors. Connected centrally to the bottom 3 is a supporting standard 14 which extends up through the top of the casing 1 and is provided with a white light bulb 15 covered by a metal casing or cap 16 connected by screw threads to a suitable clamp 17 attached to the standard 14 as shown more clearly in Fig. 3 of the drawing.

Pivoted at 18 to the standard 14 at the upper end thereof are the indicator arms 19, said arms having angular branches 20. Each of the angular branches 20 are slotted and are offset as illustrated at 21, and pivotally connected at 22 to the upper end of a link 23 by a suitable pin or rivet passing through the slot. The upper end of the core 8 is reduced at opposite sides to form a centrally projecting lug 25, to which the lower end of the link 23 is pivoted by a pin 24.

The electrical circuit may be traced as follows:

A conductor 27 is connected to a battery 28 and has connected thereto, a conductor 29 which is connected to a switch 30. A conductor 31 is connected to the switch 30 and to the left lamp 12' and solenoid 2 of the front indicator. A conductor 32 is connected to the above mentioned front left lamp and solenoid and to the battery 28, whereby upon closing the circuit through the switch 30, the left indicating arm 19 will be swung to a horizontal position or at naling position simultaneously with the illumination of the left lamp 12'. A conductor 33 is connected to the conductor 32 and to the lamp 12' and solenoid 2 of the rear left hand indicator. A conductor 34 is connected to the rear left hand lamp 12' and solenoid 2 and to the conductor 31, whereby, when the switch 30 is closed the rear left hand indicating arm 19 and the lamp 12' will be operated simultaneously with the front left hand indicating arm 19 and lamp 12', thus providing means whereby the operator may control the left hand signals of the front and rear indicators simultaneously. A conductor 35 is connected to the conductor 27 and to the lamp 12' and solenoid 2 of the right hand indicator. A conductor 36 is connected to the front right hand lamp 12' and solenoid 2 and to a switch 37. A conductor 38 is connected to the switch 37 and to the conductor 33, thus completing a circuit from the front right hand lamp 12' and solenoid 2 to the battery 28 when the switch 37 is closed, to swing the indicating arm 19 to a horizontal or signaling position and to illuminate the lamp 12'. A conductor 39 is connected to the conductor 36 and the rear right hand lamp 12' and solenoid 2. A conductor 40 is connected to the rear right hand lamp 12' and solenoid 2 and to the conductor 35, whereby, when the switch 37 is closed to operate the signals of the front right hand signals, the rear right hand lamp 12' will be illuminated and the indicating arm 19 swung to a horizontal or signaling position. A conductor 41 is connected to the conductor 32 and to the front lamp 15. A conductor 42 is connected to the lamp 15 and to a switch 43. The switch 43 is connected to the conductor 27 by a conductor 44 and by closing the switch 43, the lamp 15 will be illuminated. A conductor 45 is connected to the conductor 29 and to the rear lamp 15 and a conductor 46 is connected to the rear lamp 15 and to a switch 47. The switch 47 is connected to the conductor 33 by a conductor 48. By closing the switch 47 the lamp 15 will be illuminated.

From the foregoing it will be obvious that upon operation of the switches or buttons 31 or 34, either the right or left indicator may be thrown down into a horizontal position to indicate the direction in which the car is about to turn, and at the same time the light upon that side will also be energized.

Various changes may be made in the details of construction without departing from the spirit and scope of the invention as defined in the claims.

What is claimed is -

1. A direction indicator comprising a casing having a removable bottom, a standard arranged centrally in said casing and its upper end projecting through and beyond the top wall of the same, solenoid coils arranged in said casing on opposite sides of said standard, removable plugs fitted in the bottom wall of the casing and extending into the solenoid coils, tubes fitted in said solenoid coils, coil springs arranged in said tubes their lower ends arranged around the inner ends of the removable plugs, solenoid cores mounted in said tubes their inner ends resting upon the upper ends of the springs, direction indicating arms connected at their lower ends to said standard, and provided with laterally extending branch arms, links connected to the upper ends of the solenoid cores, their free ends being connected to the outer ends of the branch arms of the direction indicating arms, and an electric circuit for energizing said solenoid coils to move the indicating arms to indicating position.

2. A direction indicator comprising a casing having a removable bottom, a standard secured at its lower end to the bottom centrally thereof, the upper end projecting through the top wall and beyond the same, solenoid coils arranged in said casing on opposite sides of said standard, removable plugs fitted through the bottom up into said solenoid coils and having their inner ends reduced, tubes arranged in said solenoid coils around the reduced ends of the plugs, solenoid cores slidably mounted in said tubes, coil springs arranged in said tubes, their lower ends arranged around the reduced end of the plugs, and their upper ends receiving the inner ends of the solenoid cores, indicating arms having their lower ends pivotally mounted in the upper end of the standard, laterally projecting branch arms secured to the indicating arms intermediate their ends, links connected at one end to the ends of the laterally projecting branch arms, the lower end of the links being connected to the upper ends of the solenoid cores, and an electrical circuit for energizing said solenoid coils to move the indicating arms to indicating position.

3. A direction indicator comprising a casing having a removable bottom, a standard secured at its lower end to said bottom centrally thereof, its upper end projecting through the top wall of said casing beyond the same, solenoid coils arranged in said casing on opposite sides of said standard, tubes arranged in said solenoid coils, removable plugs fitted in the bottom of the casing their upper ends being reduced and fitted in the tubes of the solenoid coils, coil springs mounted in said tubes and their lower ends arranged around the reduced ends of the plugs, solenoid cores mounted in the tubes, their lower ends resting upon the upper ends of the coil springs, electric lights carried by said casing and standard, a casing for each light, direction indicating arms pivotally connected at their lower ends to the upper end of the standard, said direction indicating arms provided with branch arms intermediate their ends extending laterally therefrom in opposite directions, links connected at their lower ends to the upper ends of the solenoid cores, and at their upper ends to the outer ends of the branch arms of the direction indicating arms, and an electric circuit for energizing said solenoid coils to move the indicating arms to indicating position.

In testimony whereof I affix my signature in presence of two witnesses.

JOHN E. WARMAN.

Witnesses:
 ANDY SINCLAIR.
 F. E. BENNETT.